United States Patent Office 2,894,842
Patented July 14, 1959

2,894,842

THERMOSTABLE ACTIVE DRY YEAST COMPOSITIONS

Jack H. Mitchell, Jr., Park Forest, and John Joseph Enright, Chicago, Ill.

No Drawing. Application May 10, 1957
Serial No. 658,470

16 Claims. (Cl. 99—96)

(Granted under Title 35, U.S. Code (1952), sec. 266)

The invention described herein, if patented, may be manufactured and used by or for the Government for governmental purposes, without the payment to us of any royalty thereon.

The present invention relates to a thermostable active dry yeast composition of superior rehydratability, and processes for making the same.

Active dry yeast compositions of minimal moisture content, i.e., of a moisture content not more than about 6%, e.g., about 3 to 4%, have been developed for military and civilian uses, and have been found to possess good to excellent thermostability and storage stability. However, such compositions cannot be used in the dehydrated state for baking purposes and cannot be rehydrated simply by the addition of water, but must be subjected to a lengthy water-vapor treatment (lasting one or more hours) in order to become suitable for baking purposes. This last-mentioned step is time-consuming and would require extra equipment for the vapor treatment step.

We have now found that this disadvantage can be overcome by adding to the yeast, prior to dehydration, a small amount of a lipophilic substance, namely a long-chain aliphatic acid partial ester of sorbitan. This composition of matter is then dehydrated, preferably in several steps as will be hereinafter described more fully, to a very low moisture level, and can be stored and rehydrated by the simple addition of warm water and kneading. It is evident that this enables the military or civilian baker to prepare batches of rehydrated yeast in a minimum of time and with a maximum of convenience.

A commercial source of the lipophilic surface-active long-chain aliphatic acid partial esters of sorbitan contemplated for use in our invention is the series of "Spans" manufactured by Atlas Powder Company, e.g., the following:

|  | Principal ingredient |
|---|---|
| Span 20 | sorbitan monolaurate. |
| Span 40 | sorbitan monopalmitate. |
| Span 60 | sorbitan monostearate. |
| Span 65 | sorbitan tristearate. |
| Span 80 | sorbitan monooleate. |
| Span 85 | sorbitan trioleate. |

However, our invention is not limited to the use of these "Spans," or to the use of the specific above-identified partial esters; other partial esters of sorbitan and long-chain aliphatic acids, i.e., monoesters, diesters, and triesters of sorbitan, or mixtures of such esters, are also suitable. The esterifying long-chain aliphatic acids may be either fatty acids, such as lauric acid and its higher homologues (e.g., palmitic or stearic acid), or unsaturated acids, such as oleic acid and its homologues. By the term "'long-chain' aliphatic acid" we mean a saturated or unsaturated aliphatic acid having at least about 12 carbon atoms in the molecule, e.g., the saturated acid, lauric acid, $C_{11}H_{23}COOH$.

As heretofore pointed out, we prefer a moisture level not exceeding about 6% for our dehydrated yeast compositions, in order to assure thermostability, storage stability and minimum shipping weight. Within this range, a moisture level of about 2 to 4% is preferred, and can be attained, e.g., by air-drying the active yeast (to which the lipophilic substance has been added in accordance with our invention) to a moisture level of about 8%, and then reducing the moisture level to the desired minimal amount by vacuum drying or by the use of a conventional desiccant such as calcium oxide or other inert substances having a high affinity for water. However, it is likely that an air-drier of proper capacity could in one step bring the final product to a sufficiently low moisture content to provide a significant improvement in stability.

The amount of sorbitan ester may be varied within comparatively wide limits; thus we have obtained a dehydrated active dry yeast composition by adding to the pressed cake as little as .25% sorbitan monostearate, based on the weight of dry yeast solids. Best results are generally obtained by adding about 2% of the lipophilic substance (based on the weight of dry yeast solids); this amount may be safely exceeded but above about 5% no additional beneficial effect is obtained, and we do not therefore recommend to exceed the latter figure.

An accepted empirical formula for sorbitan (a cyclized dehydro derivative of sorbitol) is $C_6H_8O(OH)_4$. A generally accepted graphic formula for a monoester of sorbitan is a six-membered heterocyclic ring formation:

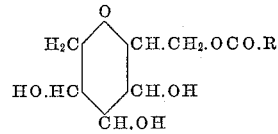

(and/or an isomeric five-membered heterocyclic ring formation), wherein R is the residue of a saturated or unsaturated long-chain aliphatic acid. The diesters and triesters are formed by also esterifying from one to two of the three hydroxyl groups which are directly attached to the heterocyclic nucleus of the sorbitan molecule. A line of surface active agents also manufactured by Atlas Powder Company is the "Tweens," which are produced by adding polyoxyethylene chains to non-esterified hydroxyl groups of "Spans" (whose principal ingredients are partial esters of sorbitan); however, these "Tweens" are hydrophilic ("water-loving"), rather than lipophilic ("'fat'-loving") surface-active agents, and have been found not to impart desirable rehydration properties to active dry yeast.

We have tested the performance characteristics of yeast compositions in accordance with our invention, by submittting the dehydrated samples to accelerate storage conditions at a temperature of 115° F. (which substantially exceeds the storage temperature of 90° F., which latter temperature is not generally exceeded in the temperate climatic zone), and using such samples, after rehydration by simply mixing with warm water, in the baking of loaves of bread in accordance with a standard procedure for making military-style white bread. The raising power of the yeast was judged by measuring the volume of the loaf in accordance with the following rate scale, applied to loaves baked in a standard military bake pan:

2200±50 cc.=unacceptable bread
2300±50 cc.=fair bread
2400±50 cc.=good bread
2500±50 cc.=very good bread
2600±50 cc.=excellent bread As will be apparent from the following specific examples, good to excellent loaves of bread were obtained from yeast compositions in accordance with our invention, which had been stored for several weeks under accelerated storage conditions, while standard commercial active dry yeast samples subjected to the same accelerated storage conditions failed after two weeks storage to produce acceptable bread. A four weeks' accelerated storage test for yeast at 115° F. has been found by previous experience to correspond to an 18 months' "unaccelerated" storage at 90° F.

We now proceed to illustrate the practice of our invention by means of several practical examples, without limiting the scope of our invention to any specific details set forth in such examples.

EXAMPLE 1

One hundred pounds of active dry yeast press cake, containing about 35% dry yeast solids and about 65% water, are thoroughly kneaded with a paste prepared as follows: 0.7 pound (equivalent to 2.0% based on the dry yeast solids) of sorbitan monopalmitate ("Span 40") is gently heated while mixing with sufficient water to increase the moisture content of the mixture of yeast press cake with this water and the sorbitan monopalmitate to about 68–72%. The water and sorbitan monopalmitate are heated until an emulsion is formed. This is then cooled to 50° F. (or even as low as 32° F.) to convert it to a paste. The paste is kneaded thoroughly and uniformly with the yeast press cake and then the mixture is divided into spaghetti-like strings before being placed in a circulatory air drier and the yeast is dried to a moisture content of approximately 8.0%. This yeast, having substantially the same moisture content as commercial active dry yeast, is subjected to further drying by vacuum at a pressure of 5–40 microns of mercury over a period of approximately 20–48 hours until its moisture content is reduced to approximately 3.0 percent. It is then subjected to a baking and loaf volume test and is compared with standard commercial active dry yeast of approximately 8.0% moisture content. This test is carried out within a week of the day on which drying in vacuo or by desiccant is completed and also after 1, 2, and 4 weeks' storage both of the experimental yeast and of the commercial active dry yeast at 115° F. to accelerate the aging of the yeast. The rehydration is accomplished by mixing the sample with warm water and kneading. The following table gives values for loaf volumes of the experimental and the control yeast samples:

|  | Loaf Volume (in c.c.) after Following Storage Periods for the Yeast at 115° F. | | | |
| --- | --- | --- | --- | --- |
|  | No Storage | 1 Week | 2 Weeks | 4 Weeks |
| Standard Commercial Active Dry Yeast | 2,600 | 2,435 | 2,235 | 1,700 |
| Active Dry Yeast According to Example 1 | 2,680 | 2,650 | 2,575 | 2,300 |

This test shows the following: After 2 weeks' exposure to the accelerated storage testing, the standard commercial active dry yeast has dropped to the borderline of acceptability, whereas the yeast of this invention is still in the "very good" class. After 4 weeks' accelerated storage testing the standard commercial active dry yeast is well below the minimum for acceptability, while the yeast of this invention still makes fair bread.

EXAMPLE 2

Active dry yeast is prepared in the same manner as described in Example 1, except that sorbitan monostearate ("Span 60") is used instead of sorbitan monopalmitate and the final moisture content of the active dry yeast containing the sorbitan monostearate is 4.0% instead of 3.0%. The following table gives values for loaf volumes of the experimental and control yeast samples subjected to 115° F. storage:

Table I

|  | Loaf Volume (in c.c.) after Following Storage Periods for the Yeast at 115° F. | | | |
| --- | --- | --- | --- | --- |
|  | No Storage | 1 Week | 2 Weeks | 4 Weeks |
| Standard Commercial Active Dry Yeast | 2,600 | 2,435 | 2,235 | 1,700 |
| Active Dry Yeast According to Example 2 |  | 2,625 | 2,500 | 2,585 |

EXAMPLE 3

Example 1 is repeated except that sorbitan tristearate ("Span 65") is applied to the yeast press cake in an amount equivalent to 2% based on the weight of dry yeast solids.

EXAMPLE 4

Example 1 is repeated except that sorbitan monooleate ("Span 80") is applied to the yeast press cake in an amount equivalent to 2% based on the weight of dry yeast solids.

EXAMPLE 5

Example 1 is repeated except that sorbitan trioleate ("Span 85") is applied to the yeast press cake in an amount equivalent to 2% based on the weight of dry yeast solids.

The final moisture content of the dehydrated products obtained according to Examples 3, 4 and 5 is 3%.

The products of Examples 3, 4 and 5 were bake-tested, after storage, in accordance with the procedure outlined in Example 1, with the following results:

Table II

|  | Loaf Volume (in c.c.) after Following Storage Periods for the Yeast at 115° F. | | | |
| --- | --- | --- | --- | --- |
|  | No Storage | 1 Week | 2 Weeks | 4 Weeks |
| Standard Commercial Active Dry Yeast | 2,600 | 2,435 | 2,235 | 1,700 |
| Active Dry Yeast According to Example 3 | 2,360 | 2,425 | 2,535 | 2,350 |
| Active Dry Yeast According to Example 4 | 2,510 | 2,425 | 2,585 | 2,410 |
| Active Dry Yeast According to Example 5 | 2,425 | 2,460 | 2,625 | 2,325 |

The foregoing table shows that the active dry yeast samples modified with sorbitan esters of long chain aliphatic acids produce fair to good bread after 4 weeks' storage at 115° F. This is approximately equivalent to at least 18 months' storage stability at temperatures up to 90° F. as pointed out.

Since certain changes in carrying out the above processes, and certain modifications in the compositions which embody the invention may be made without departing from its scope, it is intended that all matter contained in the above description shall be interpreted as illustrative and not in a limiting sense. For example, in large scale production it may be desirable to add the surface active agent to the concentrated yeast suspension after centrifuging and before filter-pressing.

We therefore desire to claim our invention broadly and to that end define the scope of our invention in the appended claims.

We claim:

1. A thermostable active dry yeast composition, said yeast composition essentially consisting of yeast having a moisture content not exceeding about 6%, and a lipophilic long-chain aliphatic acid partial ester of the heterocyclic compound sorbitan in a proportion of from about .25% to about 5% of the weight of dry yeast solids, whereby said yeast composition is rendered quickly rehydratable.

2. A yeast composition according to claim 1, wherein said ester-forming aliphatic acid is a long-chain fatty acid.

3. A yeast composition according to claim 1, wherein said ester-forming aliphatic acid has at least about 12 carbon atoms.

4. A yeast composition according to claim 1, wherein said ester-forming aliphatic acid is palmitic acid.

5. A yeast composition according to claim 1, wherein said ester-forming aliphatic acid is stearic acid.

6. A yeast composition according to claim 1, wherein said ester-forming aliphatic acid is oleic acid.

7. A yeast composition according to claim 1, wherein said ester is a member of the group consisting of long-chain aliphatic acid monoesters, diesters and triesters of sorbitan, and mixtures thereof.

8. A yeast composition according to claim 1, wherein said partial ester is a monoester.

9. A yeast composition according to claim 1, wherein said ester is sorbitan monostearate.

10. A yeast composition according to claim 1, wherein said ester is sorbitan monopalmitate.

11. A yeast composition according to claim 1, wherein said partial ester is a triester.

12. A yeast composition according to claim 1, wherein said ester is sorbitan tristearate.

13. A yeast composition according to claim 1, wherein said ester is sorbitan trioleate.

14. A yeast composition according to claim 1, said yeast composition having a moisture content of from about 2% to about 4%.

15. A yeast composition according to claim 1, wherein said ester is present in a proportion of about 2% of the weight of dry yeast solids.

16. A thermostable active dry yeast composition, said yeast composition essentially consisting of yeast having a moisture content of from about 2% to about 4% and a lipophilic long-chain aliphatic acid partial ester of the heterocyclic compound sorbitan in a proportion of about 2% of the weight of dry yeast solids, whereby said yeast composition is rendered quickly rehydratable.

References Cited in the file of this patent

UNITED STATES PATENTS

| | | |
|---|---|---|
| 1,386,359 | Penniman | Aug. 2, 1921 |
| 1,633,711 | Prince | June 28, 1927 |
| 2,111,201 | Auden | Mar. 15, 1938 |
| 2,136,399 | Schultz et al. | Nov. 15, 1938 |
| 2,223,464 | Schultz et al. | Dec. 3, 1940 |
| 2,223,465 | Schultz et al. | Dec. 3, 1940 |
| 2,523,483 | Stern | Sept. 26, 1950 |
| 2,546,251 | Baker | Mar. 27, 1951 |
| 2,830,906 | Farbak et al. | Apr. 15, 1958 |